(12) United States Patent
Chen et al.

(10) Patent No.: US 10,338,966 B2
(45) Date of Patent: Jul. 2, 2019

(54) INSTANTIATING CONTAINERS WITH A UNIFIED DATA VOLUME

(71) Applicant: Red Hat, Inc., Raleigh, NC (US)

(72) Inventors: Huamin Chen, Westborough, MA (US); Jay Vyas, Concord, MA (US)

(73) Assignee: Red Hat, Inc., Raleigh, NC (US)

( * ) Notice: Subject to any disclaimer, the term of this patent is extended or adjusted under 35 U.S.C. 154(b) by 246 days.

(21) Appl. No.: 15/492,498

(22) Filed: Apr. 20, 2017

(65) Prior Publication Data

US 2018/0307537 A1 Oct. 25, 2018

(51) Int. Cl.
| | |
|---|---|
| G06F 9/455 | (2018.01) |
| G06F 9/50 | (2006.01) |
| G06F 9/48 | (2006.01) |
| G06F 16/11 | (2019.01) |

(52) U.S. Cl.
CPC ........ *G06F 9/5016* (2013.01); *G06F 9/45504* (2013.01); *G06F 9/45545* (2013.01); *G06F 9/45558* (2013.01); *G06F 9/4881* (2013.01); *G06F 16/128* (2019.01); *G06F 2009/45575* (2013.01); *G06F 2009/45579* (2013.01)

(58) Field of Classification Search
None
See application file for complete search history.

(56) References Cited

U.S. PATENT DOCUMENTS 8,332,441 B2 12/2012 Aurora

FOREIGN PATENT DOCUMENTS

CN 106027643 A 10/2016

OTHER PUBLICATIONS

Using Data Volumes in Tasks, Amazon Web Services, Inc., Nov. 13, 2014 (7 pages).
Moatamari, Pushparaj, Snapshotting in Hadoop Distributed File System for Hadoop Open Platform as Service, Sep. 2014 (10 pages).
Persistent Volumes, Copyright 2017 The Kubernetes Authors, The Linux Foundation (21 pages).
Persistent Storage Using GCE Persistent Disk, Red Hat, Inc. and Ascii Binder, retrieved from the Internet on Mar. 28, 2017 (3 pages).

*Primary Examiner* — Gregory A Kessler
(74) *Attorney, Agent, or Firm* — K&L Gates LLP

(57) ABSTRACT

Instantiating containers with a unified data volume is disclosed. For example, a host includes a first memory, and an orchestrator requests a persistent storage to be provisioned in a second memory located across a network from the host based an image file and/or metadata associated with the image file. The persistent storage is mounted to the host. The image file is copied to the first memory as a lower system layer of an isolated guest based on the image file, where the lower system layer is write protected. An upper system layer is constructed in the first persistent storage based on the image file. A baseline snapshot of the persistent storage is captured, including the upper system layer after the upper system layer is constructed. The isolated guest is launched while attached to the lower system layer and the upper system layer.

20 Claims, 5 Drawing Sheets ial to a VM image file, in that the container image file may contain the executables and dependencies required to execute the container. In many cases, the same image file may be used to launch numerous isolated guests, for example, a load balanced service with elastic demand may launch additional copies of a container or VM executing the same application to handle additional load. In the example, each isolated guest may typically be an instance that is independent from other instances launched from the same image file.

INSTANTIATING CONTAINERS WITH A UNIFIED DATA VOLUME

BACKGROUND

The present disclosure generally relates to deploying isolated guests in a network environment. In computer systems, it may be advantageous to scale application deployments by using isolated guests such as virtual machines and containers that may be used for creating hosting environments for running application programs. Typically, isolated guests such as containers and virtual machines may be launched to provide extra compute capacity of a type that the isolated guest is designed to provide. Isolated guests allow a programmer to quickly scale the deployment of applications to the volume of traffic requesting the applications. Isolated guests may be deployed in a variety of hardware environments. There may be economies of scale in deploying hardware in a large scale. To attempt to maximize the usage of computer hardware through parallel processing using virtualization, it may be advantageous to maximize the density of isolated guests in a given hardware environment, for example, in a multi-tenant cloud. In many cases, containers may be leaner than virtual machines because a container may be operable without a full copy of an independent operating system, and may thus result in higher compute density and more efficient use of physical hardware. Multiple containers may also be clustered together to perform a more complex function than the containers are capable of performing individually. A scheduler may be implemented to allocate containers and clusters of containers to a host, the host being either a physical host or a virtual host such as a virtual machine. Typically, a container is significantly lighter weight than a virtual machine, and may be hosted in a virtual machine, allowing for additional flexibility and scalability of deployment.

SUMMARY

The present disclosure provides a new and innovative system, methods and apparatus for instantiating containers with a unified data volume. In an example, a host includes a first memory, and an orchestrator requests a persistent storage to be provisioned in a second memory located across a network from the host based an image file and/or metadata associated with the image file. The persistent storage is mounted to the host. The image file is copied to the first memory as a lower system layer of an isolated guest based on the image file, where the lower system layer is write protected. An upper system layer is constructed in the first persistent storage based on the image file. A baseline snapshot of the persistent storage is captured, including the upper system layer after the upper system layer is constructed. The isolated guest is launched while attached to the lower system layer and the upper system layer.

Additional features and advantages of the disclosed method and apparatus are described in, and will be apparent from, the following Detailed Description and the Figures.

DETAILED DESCRIPTION OF EXAMPLE EMBODIMENTS

Figure 1:
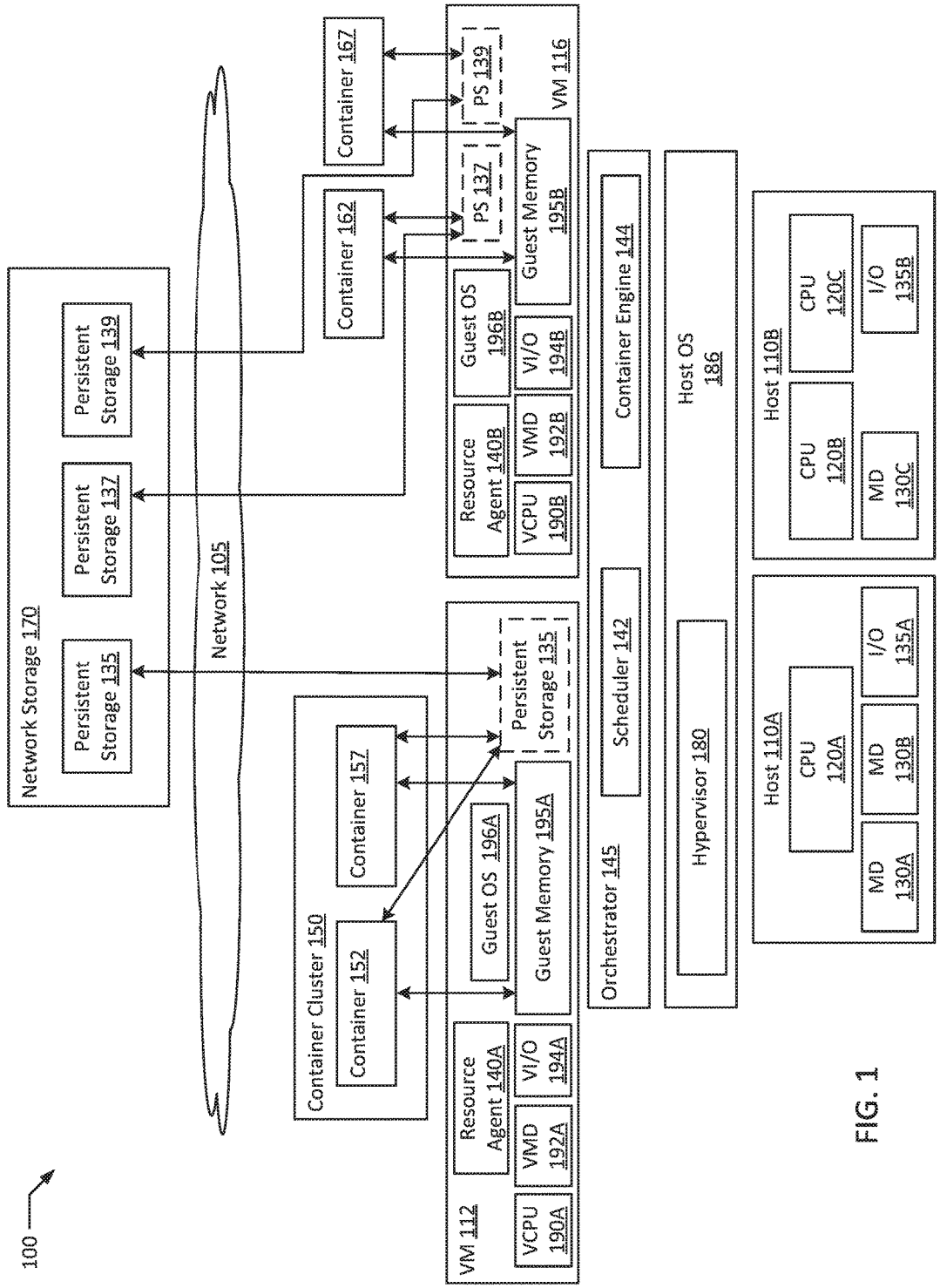
FIG. 1 is a block diagram of a system instantiating containers with a unified data volume according to an example of the present disclosure.

In computer systems utilizing isolated guests, typically, virtual machines and/or containers are used. In an example, a virtual machine ("VM") may be a robust simulation of an actual physical computer system utilizing a hypervisor to allocate physical resources to the virtual machine. In some examples, container based virtualization system such as Red Hat® OpenShift® or Docker® may be advantageous as container based virtualization systems may be lighter weight than systems using virtual machines with hypervisors. In the case of containers, oftentimes a container will be hosted on a physical host or virtual machine that already has an operating system executing, and the container may be hosted on the operating system of the physical host or VM. In large scale implementations, container schedulers, such as those included in container orchestrators (e.g., Kubernetes®), generally respond to frequent container startups and cleanups with low latency. Containers may allow wide spread, parallel deployment of computing power for specific tasks. In a typical example, a container may be instantiated to process a specific task and reaped after the task is complete.

Due to economies of scale, containers tend to be more advantageous in large scale hardware deployments where the relatively fast ramp-up time of containers allows for more flexibility for many different types of applications to share computing time on the same physical hardware, for example, in a private or multi-tenant cloud environment. In some examples, where containers from a homogenous source are deployed, it may be advantageous to deploy containers directly on physical hosts. In a multi-tenant cloud, it may be advantageous to deploy containers and groups of containers within virtual machines as the hosting service may not typically be able to predict dependencies for the containers such as shared operating systems, and therefore, using virtual machines adds flexibility for deploying containers from a variety of sources on the same physical host. Typically, while containers may be light weight and disposable, at least some of the data that is processed by the container or data that results from the processing of the container may be persistent data. In many environments, persistent data may be hosted on persistent storage provided by a storage provider. In an example, a container may operate with multiple different storage requirements (e.g., persistent storages for data, logs, and results). In an example, a container may further require scratch space (e.g., temp directories) for transient data. In a typical example, transient data may be hosted on local storage on the container host.

In a typical setup, isolated guests may be instantiated from image files storing the core requirements for launching a new instance of the isolated guest. For example, an image file for a VM may include an operating system and pre-installed applications on the operating system for executing required tasks. An image file for a container may be similarly constructed with required applications and dependencies, but may be lighter weight, with many unused operating system features disabled or removed, or even without an operating system at all. In an example, when a new container is instantiated, the image file may be copied to a memory (e.g., local storage on the container's host), and the copy of the image filed may be configured to be write protected to act as a foundation with the necessary code for the container to perform its designated task. In the example, a writeable upper system layer may then be constructed on top of the lower system layer to provide the executing container with transient scratch space to, for example, perform input/output ("I/O") operations.

In an example, the upper system layer may be constructed in the same storage (e.g., local storage on the container's host), but the local storage may have insufficient capacity or performance characteristics (e.g., write speed, read speed, or data redundancy) to host all of the directories required by the container. For example, while adding network latency by using remote storage may incur an initial startup delay for a given transfer, the rate limiting step in a data transfer may be based on physically accessing information from a storage device. In an illustrative example, local storage on the container's host may often be limited to a small number of physical devices (e.g., two to six hard drives). In an example with a hardware node hosting ten VMs, each of which hosts 200 containers, requests for hard drive I/O may well exceed the limits of the limited number of hard drives available. In such examples, a 1 ms-5 ms network delay to start a data transfer may well be a performance boost compared to being queued for access to local storage. In an example, the image file associated with a given container may include mount specifications dictating, for example, the capacity and performance characteristics of external data volumes required by the container. The mount specifications may then result in the provisioning of persistent storage volumes from a storage provider with proper performance characteristics and capacity, which may then be attached to the upper system layer as mounted volumes. In an example, operation as temporary scratch space may require high throughput (e.g., high I/O rates) due to constant writing and deleting of temporary data. In the example, as the number of containers on a host increases, the I/O rates of the physical storage on the host may become a bottleneck for container performance. In addition, as the upper system layer and the various persistent storage volumes mounted as mounted volumes to the upper system layer may typically reside across a network from each other on different physical systems, backup systems to capture snapshots of the contents of the upper system layer may typically be unable to capture a consistent instantaneous state across the upper system layer and the various mounted volumes, presenting synchronization issues if the snapshot is required to be restored as an operational container. In a typical example, developers may over-estimate requirements for specific directories for worst case scenarios, typically resulting in certain persistent storage volumes being severely underutilized when others are near capacity from routine processing. For example, a persistent storage volume mounted as a directory for debugging and/or error logging may be virtually unused during normal execution, but may be robustly provisioned in case a large data dump from a failed execution of an application is required.

In an example, for processing more complex tasks, multiple containers may be grouped together into container clusters (e.g., Kubernetes® pods), that are deployed together and function as an interconnected whole. In a typical example, synchronization of snapshotting across multiple containers in a pod may be further compounded by the multiplicative effect of having persistent storage volumes as mounted volumes on the container cluster with each persistent storage volume potentially being hosted on separate storage nodes. As a result, it may be difficult if not impossible to migrate executing containers to a different host, for example, for a maintenance event or to consolidate containers for efficiency. In addition, as the quantity of containers on a given host rises, typically, so does local storage utilization. In an example, lower system layers may be static in size based on the size of the image files associated with the containers executing on the host. However, upper system layers used as temporary scratch space may grow and shrink with the execution of the various containers and may run the local storage out of space during spikes, impacting all of the containers hosted by the host.

The present disclosure aims to address existing challenges in the synchronization and efficient use of storage by isolated guests by instantiating containers with a unified data volume. In an example, a file system with a multi-layered storage structure such as Overlay FS may allow a container's storage to be split into a write protected lower system layer and a writeable upper system layer. In the example, a single persistent storage may be requested for an entire container cluster with sufficient capacity and performance characteristics to meet the needs of the entire container cluster. In the example, the persistent storage may then be mounted to the host, and the persistent storage may then host all of the upper system layers, including all of the mounted directories in the mount specifications of the image files associated with the container cluster. In an example, lower system layers for the containers may still be copied to local storage on the host. In the example, since lower system layers are static and write protected, the usage of the local storage on the host becomes very predictable since temporary scratch space in the upper system layers is moved to the persistent storage. Since all of the writeable space for each container in the pod (e.g., the upper system layers including the mounted directories) is located in the same physical storage hosting the persistent storage mounted on the host, a consistent snapshot of a current state of the entire cluster is possible by freezing the persistent storage as a whole. By enabling consistent snapshots, migration and/or cloning of the persistent storage and of the executing container cluster are therefore enabled. In addition, with all of the writeable directories for a container cluster stored in one unified namespace and one unified persistent storage, actual usage may advantageously average out the overprovisioning and under provisioning effects observed where individual persistent storage volumes are provisioned for each mounted directory on each container.

In an example, additionally incorporating thin provisioning (e.g., where storage capacity and/or performance characteristics are partially granted at request time, with the persistent storage allowed to dynamically grow as storage capacity and/or performance characteristics are consumed) in the provisioning of the persistent storage allows for greatly increased storage efficiency. For example, each container in a cluster may request a mounted directory for storing a core dump in the case of an application crash, but the odds of multiple containers using that space in a given deployment may be very low. In the example, where twenty containers each request 10 gb of storage that is unlikely to be used, but when required most of the 10 gb may be consumed before additional storage may be provisioned to capture the core dump. Where the twenty containers share a common persistent storage, 20 gb total may be provisioned at startup time to the persistent storage rather than 200 gb, with the 20 gb allowed to grow if 10 gb were used. In the example, 180 gb of storage may be saved if none of the twenty containers experiences a catastrophic crash during execution at the cost of potentially losing data if multiple containers crashed within a short timeframe of each other (e.g., before the persistent storage could sufficiently grow). In example systems instantiating containers with a unified data volume, computer storage may be allocated more efficiently with higher densities and in some cases, significantly less wasted storage space. As a result energy usage and heat generation for the system may decrease while more guests may be hosted on less physical hardware. In addition, the implementation of the persistent storage for the entire upper system layer, remote from the host hosting the containers, enables synchronized snapshotting for backup and migration purposes. Enabling customizable directory requirements on a per-directory basis additionally allows for the benefits of customizable performance available to mounted directories where different persistent storage volumes are mounted for each performance profile to each container.

FIG. 1 is a block diagram of a system instantiating containers with a unified data volume according to an example of the present disclosure. The system 100 may include one or more interconnected hosts 110A-B. Each host 110A-B may in turn include one or more physical processors (e.g., CPU 120A-C) communicatively coupled to memory devices (e.g., MD 130A-C) and input/output devices (e.g., I/O 135A-B). As used herein, physical processor or processors 120A-C refers to a device capable of executing instructions encoding arithmetic, logical, and/or I/O operations. In one illustrative example, a processor may follow Von Neumann architectural model and may include an arithmetic logic unit (ALU), a control unit, and a plurality of registers. In an example, a processor may be a single core processor which is typically capable of executing one instruction at a time (or process a single pipeline of instructions), or a multi-core processor which may simultaneously execute multiple instructions. In another example, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU).

As discussed herein, a memory device 130A-C refers to a volatile or non-volatile memory device, such as RAM, ROM, EEPROM, or any other device capable of storing data. As discussed herein, I/O device 135A-B refers to a device capable of providing an interface between one or more processor pins and an external device, the operation of which is based on the processor inputting and/or outputting binary data. Processors (Central Processing Units "CPUs") 120A-C may be interconnected using a variety of techniques, ranging from a point-to-point processor interconnect, to a system area network, such as an Ethernet-based network. Local connections within each host 110A-B, including the connections between a processor 120A and a memory device 130A-B and between a processor 120A and an I/O device 135A may be provided by one or more local buses of suitable architecture, for example, peripheral component interconnect (PCI).

In an example, hosts 110A-B may run one or more isolated guests, for example, containers 152, 157, 162, 167 and VMs 112 and 116. In an example, any of containers 152, 157, 162, and 167 may be a container using any form of operating system level virtualization, for example, Red Hat® OpenShift®, Docker® containers, chroot, Linux®-VServer, FreeBSD® Jails, HP-UX® Containers (SRP), VMware ThinApp®, etc. Containers may run directly on a host operating system or run within another layer of virtualization, for example, in a virtual machine. In an example, containers that perform a unified function may be grouped together in a container cluster (e.g., container cluster 150) that may be deployed together (e.g., in a Kubernetes® pod). In an example, a given service may require the deployment of multiple containers and/or pods in multiple physical locations. In an example, containers 152 and 157 may be part of container cluster 150, which may execute on VM 112. In an example, containers 162 and 167 may execute on VM 116. In an example, any of containers 152, 157, 162, and 167 may be executing directly on either of hosts 110A-B without a virtualized layer in between. In an example, orchestrator 145 may be a container orchestrator such as Kubernetes® or Docker Swarm®, which may execute directly on host operating system ("OS") 186. In another example, orchestrator 145 along with subcomponents scheduler 142 (e.g., Kubernetes® scheduler) and/or container engine 144 (e.g., Docker® engine) may execute on a separate host system, for example across network 105 from hosts 110A-B. In an example, orchestrator 145, scheduler 142, and container engine 144 may be applications that schedule, launch, and/or manage isolated guests (e.g., containers 152, 157, 162, 167 and VMs 112 and 116). In an example, isolated guests may be further nested in other isolated guests. For example VM 112 may host a container cluster 150 including containers 152 and 157, while VM 116 may host containers 162 and 167.

System 100 may run one or more VMs (e.g., VMs 112 and 116), by executing a software layer (e.g., hypervisor 180) above the hardware and below the VMs 112 and 116, as schematically shown in FIG. 1. In an example, the hypervisor 180 may be a component of the host operating system 186 executed by the system 100. In another example, the hypervisor 180 may be provided by an application running on the operating system 186, or may run directly on the hosts 110A-B without an operating system beneath it. The hypervisor 180 may virtualize the physical layer, including processors, memory, and I/O devices, and present this virtualization to VM 112 as devices, including virtual central processing units ("VCPUs") 190A-B, virtual memory devices ("VMDs") 192A-B, virtual input/output ("VI/O") devices 194A-B, and/or guest memories 195A-B. In an example, a container may execute directly on host OS 186 without an intervening layer of virtualization.

In an example, a VM 112 may be a virtual machine and may execute a guest operating system 196A which may utilize the underlying VCPU 190A, VMD 192A, and VI/O 194A. One or more containers that may host isolated guests (e.g., containers 152 and 157) may be running on a VM 112 under the respective guest operating system 196. Processor virtualization may be implemented by the hypervisor 180 scheduling time slots on one or more physical processors 120A-C such that from the guest operating system's perspective those time slots are scheduled on a virtual processor 190A.

A VM 112 may run on any type of dependent, independent, compatible, and/or incompatible applications on the underlying hardware and host operating system 186. In an example, containers 152 and 157 running on VM 112 may be dependent on the underlying hardware and/or host operating system 186. In another example, containers 152 and 157 running on VM 112 may be independent of the underlying hardware and/or host operating system 186. In an example, containers 152 and 157 running on VM 112 may be compatible with the underlying hardware and/or host operating system 186. Additionally, containers 152 and 157 running on VM 112 may be incompatible with the underlying hardware and/or OS. The hypervisor 180 may manage memory for the host operating system 186 as well as memory allocated to the VM 112 and guest operating system 196A such as guest memory 195A provided to guest OS 196. In an example, persistent storage 135 may be provisioned from network storage 170 located across network 105 from VM 112, and persistent storage 135 may be mounted to VM 112. In an example, persistent storage 135 may be associated with upper system layers of containers 152 and 157, while guest memory 195A may be associated with lower system layers of containers 152 and 157. In an example, containers 162 and 167 may be individual containers (e.g., not part of a cluster) executing on VM 116. In the example, persistent storage 137 associated with container 162 and persistent storage 139 associated with container 167 may be hosted on network storage 170 and mounted to VM 116. In an example, resource agents 140A-B manage compute resources such as persistent storage capacity and performance characteristics for containers on the resource agent's respective hosts (e.g., resource agent 140A for VM 112 and resource agent 140B for VM 116). In an example, container engine 144 may be a component part of a container orchestrator 145. In other examples, container engine 144 may be a stand alone component. Similarly, scheduler 142 may be a standalone component. In some examples, container engine 144, scheduler 142, resource agents 140A-B, and hosts 110A-B may reside over a network 105 from each other, which may be, for example, a public network (e.g., the Internet), a private network (e.g., a local area network (LAN) or wide area network (WAN)), or a combination thereof.

In an example, persistent storages 135, 137, and 139 are implemented on a file system that supports layering (e.g., OverlayFS). In the example, the file system of each container (e.g., containers 152, 157, 162, and 167) may appear as one unified volume to applications executing on containers 152, 157, 162, and 167, which are respectively associated with persistent storages 135, 137, and 139. However, in an example, persistent storages 135, 137, and 139 may actually include part of a file system including two or more layers, including at least a lower base-build layer that includes the core files required to execute a container, and an upper dynamic layer for storing any changes from the base-build as the container executes. In an example, data in the lower layer is never overwritten while a container is executing. In an example the lower system layers for containers 152 and 157 may be hosted in guest memory 195A. In an example, a multi-layer system may include multiple upper layers, accessible and/or writeable by different accounts, groups of accounts, and/or permission levels.

Figure 2:
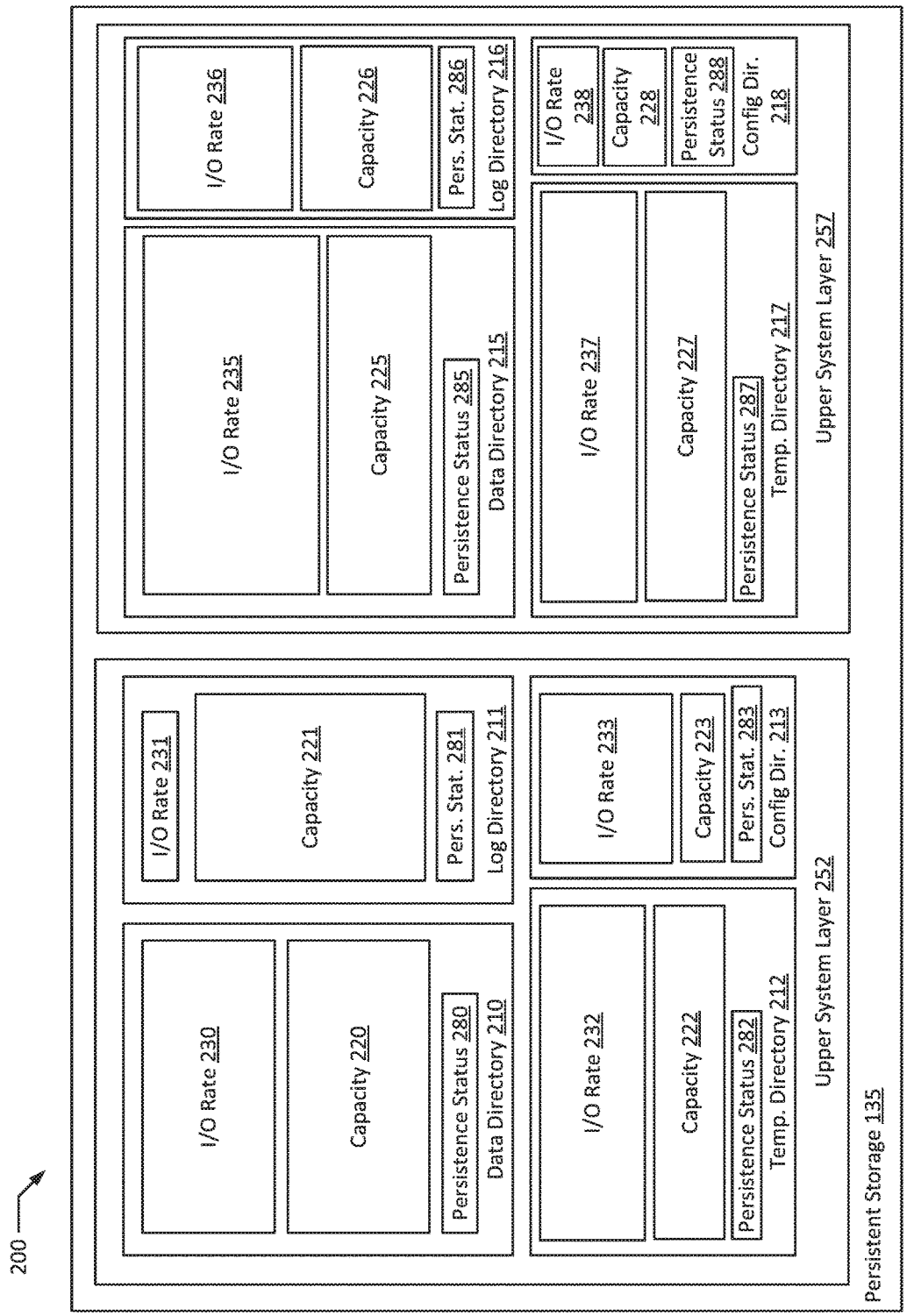
FIG. 2 is a block diagram illustrating an example directory structure in a persistent storage provisioned by a system instantiating containers with a unified data volume according to an example of the present disclosure.

FIG. 2 is a block diagram illustrating an example directory structure in a persistent storage provisioned by a system instantiating containers with a unified data volume according to an example of the present disclosure. Illustrated example system 200 in FIG. 2 is an expanded view of persistent storage 135, which may include two upper system layers (e.g., upper system layer 252 associated with container 152, and upper system layer 257 associated with container 157). In an example, each of upper system layers 252 and 257 further includes a plurality of directories (e.g., directories 210, 211, 212, 213, 215, 216, 217, and 218). In the example, each directory may further include performance characteristics associated with that directory (e.g., I/O Rates 230, 231, 232, 233, 235, 236, 237, and 238), a capacity associated with the directory (e.g., capacities 220, 221, 222, 223, 225, 226, 227, and 228), and a persistence status of the directory (e.g., persistence statuses 280, 281, 282, 283, 285, 286, 287, and 288).

In an example, container 152 may host an application that processes credit card transactions. In the example, an image file for container 152 may include, and/or may be associated with metadata that includes mount specifications indicating that container 152 requires a mounted data directory 210, a log directory 211, and a configuration directory 213. In the example, data directory 210 may be a local instance of a user database, including customer account information (e.g., name, ID number, address, preferred form of payment, etc.), which may require a high I/O rate 230 and a high capacity 220 to quickly process transactions and record results. In the example, data directory 210 may be flagged as a persistent directory in persistence status 280, indicating that the data in capacity 220 should survive a termination of container 152. In the example, log directory 211 may be another persistent directory as indicated in persistence status 281, with a similarly large storage capacity 221 to storage capacity 220, but with a significantly lower I/O rate 231 as compared to I/O rate 230. In the example, log directory 211 may be for medium term storage of any notable execution events and/or errors encountered through the execution of container 152. In an example, I/O rate 231 may not need to be very high performance as individual reads and writes may typically be very small and slowdowns on log directory 211 may not affect the overall observed performance of container 152. However, capacity 221 may be required to be large to store logs for a sufficient retention period. A configuration directory 213 may include application configurations which may need a high I/O rate 233 to enable rapid reading, for example, for context switching, but capacity 223 may be low due to a relatively small number of relatively small configuration files being stored. Configuration directory 213 may also be flagged as persistent in persistent status 283. In an example, a large directory such as temporary directory 212 may provide a fairly large capacity 222 for temporary files. For example, temporary directory 212 may store data swapped in and out of Random Access Memory ("RAM"), an operation that requires a high I/O rate 232, but the data may not be useful after shut down so persistence status 282 may be set to temporary. In an example, temporary directory 212 may not be associated with a mount specification. Also, in an example, temporary or ephemeral data stored in temp directory 212 may be lost when container 152 exits.

In comparison, upper system layer 257 attached to container 157 may include four similar directories in data directory 215, log directory 216, configuration directory 218, and temporary directory 217, which are comparable to data directory 210, log directory 211, configuration directory 213, and temporary directory 212 of upper system layer 252. In an example, container 157 may host an application serving instructional videos to assist users in using a shopping interface associated with the payment system hosted on container 152. In an example, persistence statuses 285, 286, and 288 may be flagged as persistent while persistence status 287 may be flagged as temporary, respectively similar to persistence statuses 210-213. In an example, capacity 225 may be of a size similar to capacity 220, and capacity 225 may host a plurality of instructional videos in different resolutions to serve to customers. In the example, data directory 215 requires a high I/O rate 235 to smoothly serve video content. In an example, for an instructional video service, retaining logs long term may be extraneous so log directory 216 may have a relatively small capacity 226, but a relatively high I/O rate 236 may be provisioned, for example, due to the video serving application on container 157 dumping the digital video file being served at the time of an error to the log directory 216 when there is an error with the system. In an example, configuration directory 218 may be required to deliver configurations to the applications executing on container 157 less often than configuration directory 213 does to the applications executing on container 152. In the example, I/O rate 238 may be lower than I/O rate 233 while capacity 228 may be similar in size to capacity 223. In an example, temporary directory 217 may be configured similarly to temporary directory 212, but with slightly higher capacity 227 and I/O rate 237 than capacity 222 and I/O rate 232 due to handling video files which may generally be larger than user account files.

Figure 3:
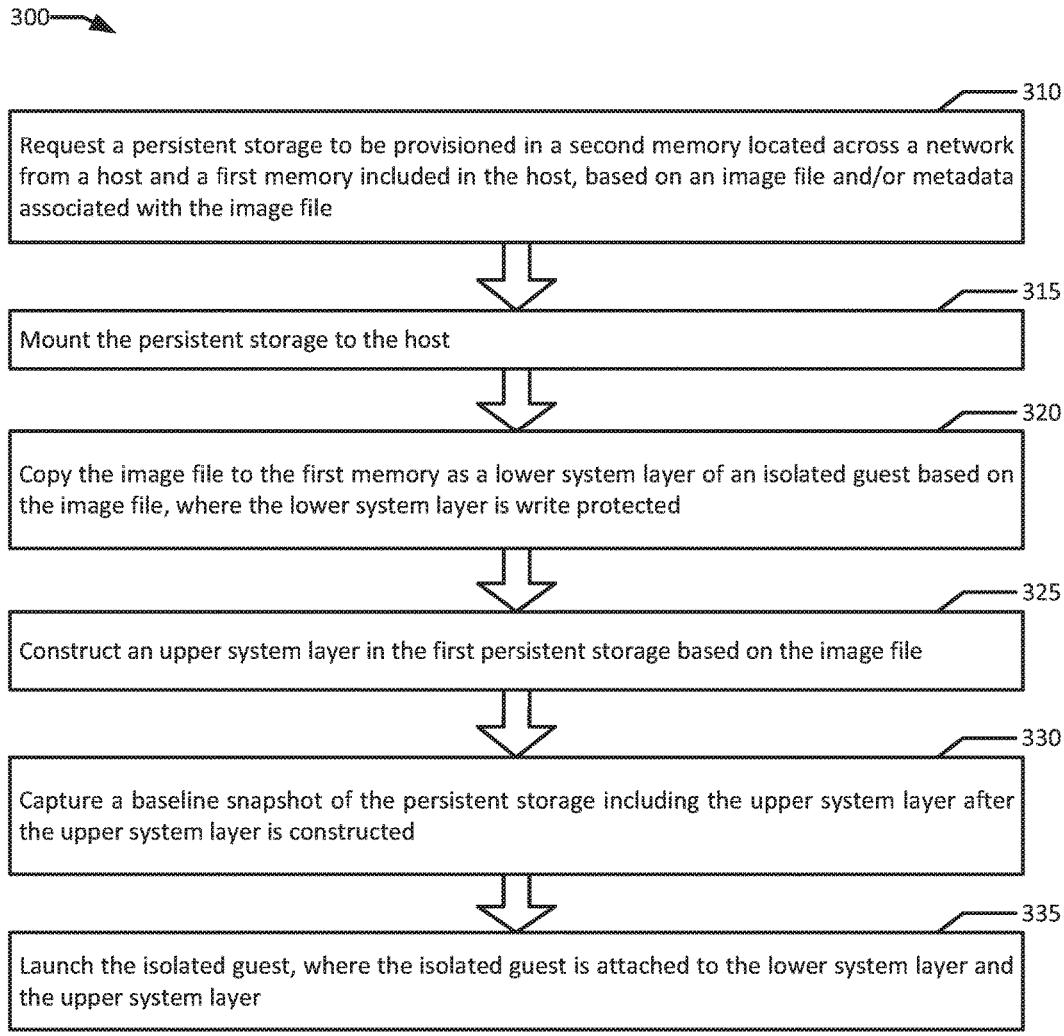
FIG. 3 is a flowchart illustrating an example of instantiating containers with a unified data volume according to an example of the present disclosure.

FIG. 3 is a flowchart illustrating an example of instantiating containers with a unified data volume according to an example of the present disclosure. Although the example method 300 is described with reference to the flowchart illustrated in FIG. 3, it will be appreciated that many other methods of performing the acts associated with the method 300 may be used. For example, the order of some of the blocks may be changed, certain blocks may be combined with other blocks, and some of the blocks described are optional. The method 300 may be performed by processing logic that may comprise hardware (circuitry, dedicated logic, etc.), software, or a combination of both. In an example, the method 300 is performed by an orchestrator 145 including a scheduler 142 and a container engine 144, in conjunction with a resource agent 140B and a network storage 170.

Example method 300 may begin with requesting a persistent storage to be provisioned in a second memory located across a network from a host and a first memory included in the host, based on an image file and/or metadata associated with the image file (block 310). In an example, scheduler 142 requests network storage 170 to provision persistent storage 137 based on an image file and/or metadata associated with the image file. In an example, the image file may be an image file from which container 162 may be instantiated. In an example, network storage 170 may be configured to meet a performance characteristic requirement and/or a capacity requirement based on the image file and/or the metadata. For example, persistent storage requirements such as capacity and/or performance characteristics (e.g., access time, data transfer rate ("I/O rate"), power consumption) may be included as values in the image file and/or the metadata. In an example, access time may include any form of latency incurred in accessing data from the persistent storage 137 (e.g., seek time, rotational latency, command processing overhead). In another example, persistent storage capacity and/or performance characteristic requirements may be based on metrics of past usage by similar containers to container 162 accessible to the scheduler 142 that are, for example, stored in a database.

The persistent storage is mounted to the host (block 315). In an example, the persistent storage 137 is mounted to VM 116. In the example, VM 116 may be a virtual machine executing on hypervisor 180 on host 110B, and container 162 will execute on VM 116. In another example, the persistent storage 137 may be mounted directly to host 110B where container 162 would execute on host OS 186 on host 110B directly. In an example, VM 116 may also execute on a persistent storage. For example, VMD 192B and/or guest memory 195B may be volumes on a persistent storage mounted on host 110B. In an example, resource agent 140B mounts persistent storage 137 to VM 116. In an example, persistent storage 116 is mounted as a network drive on VM 116. In an example, mounting the persistent storage 137 may be followed by formatting of the persistent storage 137, for example, by resource agent 140B.

The image file is copied to the first memory as a lower system layer of an isolated guest based on the image file, where the lower system layer is write protected (block 320). In an example, container engine 144 copies the image file to guest memory 195B and/or VMD 192B, where the image file is set to read-only. In the example, the image file may be the lower system layer including data essential to the execution of container 162 (e.g., libraries, operating system). In an example, the lower system layer is not modified while container 162 executes. In an example, guest memory 195B may host a plurality of lower system layers each associated with a container executing on VM 116. In an example, hundreds, even thousands of containers may be hosted on VM 116. In the example, with lower system layers configured to be read-only, a required capacity of guest memory 195B may be very predictable as growth in usage may generally be due to the operation of guest OS 196B.

An upper system layer is constructed in the first persistent storage based on the image file (block 325). In an example, the container engine 144 constructs an upper system layer for container 162 in persistent storage 137. In the example, applications executing in container 162 may perceive the lower system layer and upper system layer as one unified file system, however, the upper system layer may be configured to be read-write while the lower system layer may be configured to be read-only. In an example, any changes to any files in the image file that occur through the execution of container 162 are saved in the upper system layer. In an example, the upper system layer may include core directories for the execution of the container (e.g., /, /bin, /boot, /etc, /var, /tmp, /usr, /home, /sbin). In an example, each directory in the upper system layer may be individually configured with respective directory specific requirements, and the respective directory specific requirements are included in the provisioning of the persistent storage 137. For example, persistent storage 137 may be an aggregate of the various requirements of each of the directories in the upper system layer of container 162. In an example, directory specific requirements may include (i) a persistence status, (ii) a performance characteristic, (iii) a capacity, (iv) an encryption setting, and (v) a type of reservation. In an example, the /data directory may be flagged to be encrypted to protect user identifying information.

In an example, the type of reservation may be a thick reservation, where the performance characteristic and the capacity are pre-allocated and guaranteed when the persistent storage is provisioned, a thin reservation, where a portion of the performance characteristic and the capacity of the directory are pre-allocated when the persistent storage is provisioned, with the persistent storage being allowed to grow dynamically as at least one of the performance characteristics and the capacity is consumed, and/or a combination of thick and thin reservation. For example, the a reservation may be thick for throughput (e.g., I/O rate) but thin for capacity. In an example, the image file may specify 100 GB in storage for the transient portion (e.g., /, /bin, /boot, /etc, /var, /tmp, /usr, /home, /sbin) of the upper system layer including directories flagged as temporary for container 162, and an additional 100 GB in storage for the /data directory. In an example, the /data directory may be flagged for thick provisioning, where the total amount of requested space is allocated by network storage 170 at once, while the transient portion may be flagged for thin provisioning, where a subset of the total space is allocated at startup and the space is allowed to grow to the requested limit. In an example, persistent storage 137 may be initially granted with 110 GB of storage, 100 GB for /data and 10 GB for everything else. In the example, when other directories use 5 GB of storage, an additional 20 GB may be granted to persistent storage 137 and again at 15 GB of usage, an additional 30 GB may be granted to persistent storage 137 for a total of 60 GB outside of /data.

In an example, an image file and/or metadata associated with the image file may include mount specifications for certain directories of isolated guests launched from the image file. For example, container 162 may require a /data directory with 100 GB of capacity and a peak throughput of 100 MB/s. In an example, a separate persistent storage may be requested specifically for the /data directory and then mounted to the upper system layer for container 162. However, in such an example, the separate persistent storage may be on a different system from persistent storage 137 presenting potential synchronization and latency issues between the /data directory and the rest of the upper system layer. In an example, persistent storage 137 may be requested including the requirements for the /data directory, and the resource agent 140B may create the /data directory in the persistent storage 137, with dedicated throughput and capacity for the /data directory. In the example, the /data directory may then be mounted to the upper system layer for container 162 as a mounted directory. In an example the mounted directory /data may be flagged with a persistence status of persistent, while a directory such as /tmp in the upper system layer may be flagged as temporary. After being mounted, the /data directory may be a unified part of the upper system layer with a shared namespace with the rest of the upper system layer. In an example, each directory (including mounted directories) in the upper system layer shares the same namespace.

In an example, a baseline snapshot of persistent storage 137 is captured, including the upper system layer after the upper system layer is constructed (block 330). For example, a snapshot in network storage 170 may be triggered to capture the initial state of the upper system layer prior to container 162 being launched. For example, resource agent 140B or container engine 144 may request the baseline snapshot. In an example, the baseline snapshot may be configured to capture all of the contents of persistent storage 137. In another example, the baseline snapshot may be configured to capture a subset of the contents of persistent storage 137. The isolated guest is launched, where the isolated guest is attached to the lower system layer and the upper system layer (block 335). In an example, after network storage 170 captures the baseline snapshot of persistent storage 137, container 162 is ready to be launched, and orchestrator 145 may trigger the launching of container 162, for example, by container engine 144. In the example, the container 162 may execute with all of its writeable storage located on persistent storage 137.

In an example, the /data mounted directory in the upper system layer for container 162 on persistent storage 137 may be flagged as persistent while the /tmp directory in the upper system layer is flagged as temporary. In an example, an executing snapshot is taken of the persistent storage 135 after container 162 has been launched. In the example, the /tmp directory may include scratch space for transient data used in calculations, while the /data directory may include the results of container 162's processing. In an example, a temporary directory may include ephemeral data that may be cleansed to reinitialize the container. In the example, directories flagged as temporary may be deleted from persistent storage 137 to reinitialize container 162. For example, the /tmp directory may be overwritten by an empty /tmp directory. In an example, the persistent storage 137 and optionally the container 162 may be frozen to allow for the capture of an executing snapshot of the current state of the upper system layer of container 162. In an example, an executing snapshot may be captured immediately prior to a migration and/or re-initialization of either a container or a persistent storage. In the example, after the executing snapshot is complete, persistent storage 137 may be resumed. In an example, the resource agent 140B may be configured to capture the baseline snapshot and/or the executing snapshot. In another example, the resource agent 140B or the orchestrator 145 may request the capture of the baseline snapshot and/or the executing snapshot, for example, by requesting network storage 170 to perform the capture. In an example, orchestrator 145 may cause container 162 to be reinitialized. For example, orchestrator 145 may command container 162 to exit, then restore the baseline snapshot for the persistent storage 137, but the orchestrator 145 may exclude mounted directories such as, /data from being restored, for example, based on the /data directory being associated with the mount specification for the image file used to launch container 162. In another example, a directory specific requirement flagged on the /data directory may exclude the directory from restoration. In an example, after the restoration of the upper system layer excluding any mounted directories, container 162 is relaunched and attached again to the lower system layer and the restored upper system layer. In the example, the container 162 would then be attached to a clean upper system layer and successfully reinitialized, but with the benefit of still having access to the data in the /data directory from container 162's previous incarnation. In an example, the restart including baseline snapshot restoration of container 162 may be much faster than provisioning a new container from the image file for container 162.

Figure 4:
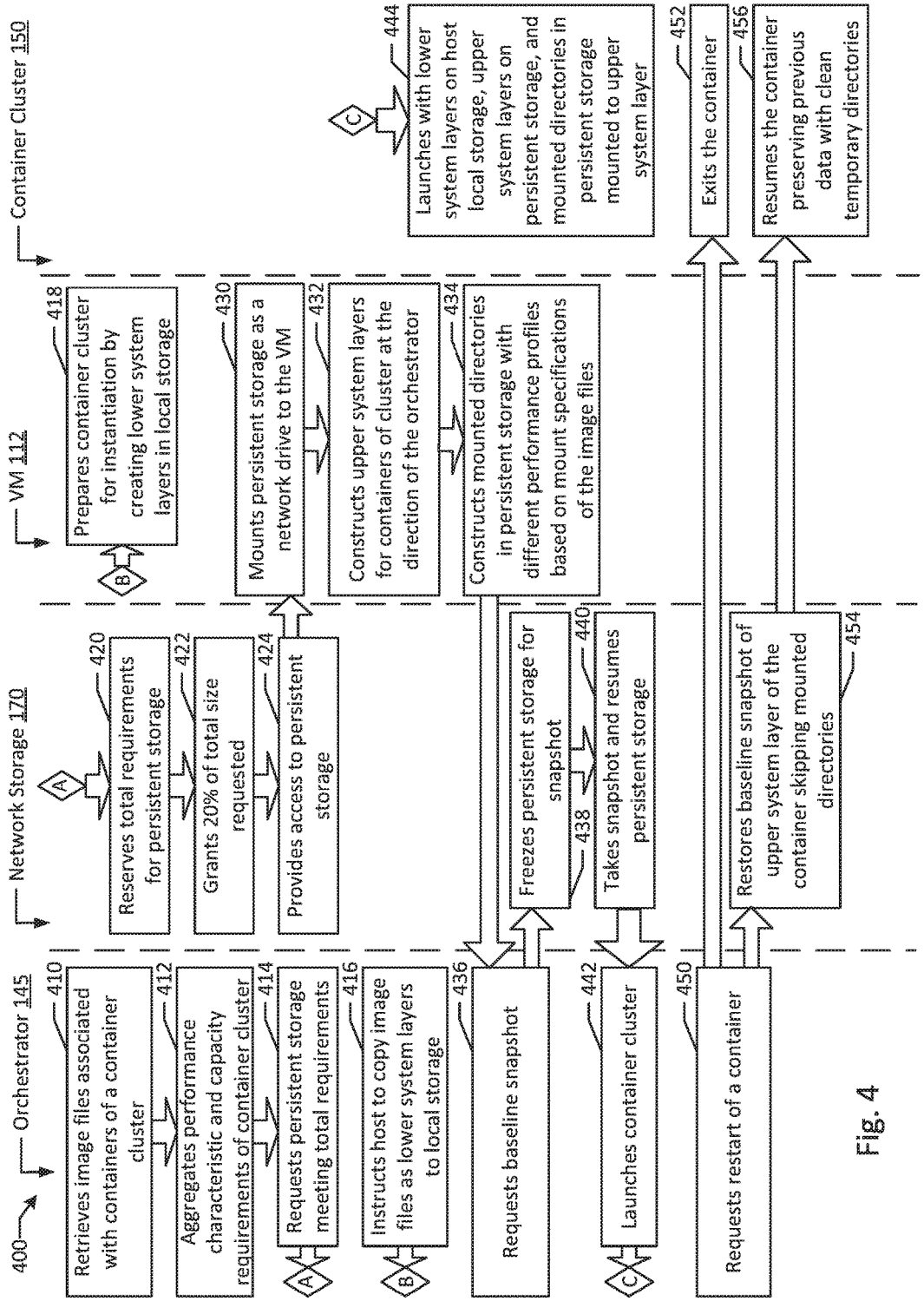
FIG. 4 is flow diagram of an example of instantiating containers with a unified data volume according to an example of the present disclosure.

FIG. 4 is flow diagram of an example of instantiating containers with a unified data volume according to an example of the present disclosure. Although the examples below are described with reference to the flowchart illustrated in FIG. 4, it will be appreciated that many other methods of performing the acts associated with FIG. 4 may be used. For example, the order of some of the blocks may be changed, certain blocks may be combined with other blocks, and some of the blocks described are optional. The methods may be performed by processing logic that may comprise hardware (circuitry, dedicated logic, etc.), software, or a combination of both. In illustrated example 400, an orchestrator 145, a network storage 170, a virtual machine 112, instantiate a container cluster 150 with a unified data volume.

In an example, orchestrator 145 may receive an instruction to launch a container cluster 150. In the example, container cluster 150 may include a payment processing service on container 152 and a instructional video service for the payment processing service on container 157. In an example, orchestrator 145 retrieves image files associated with each of the containers (e.g., containers 152 and 157) in container cluster 155 (block 410). In an example, orchestrator 145 aggregates performance characteristics and capacity requirements for the entire container cluster 150 (block 412). In an example, the performance characteristics and capacity requirements may be included in metadata associated with the image files. Orchestrator 145 may then request network storage 170 to provision a persistent storage 135 that meets the total requirements for the entire container cluster 150 (e.g., 500 GB) (block 414). In an example, the orchestrator 145 also instructs VM 112 which will host container cluster 150 to copy the image files as lower system layers to local storage (e.g., guest memory 195A and/or VMD 192A) (block 416). In an example, the orchestrator sends the request to network storage 170 and VM 112 substantially simultaneously (e.g., immediately before or after such that the copying and provisioning overlap in time).

In an example, network storage 170 reserves the total requirements for persistent storage 135 (block 420). In the example, the majority of directories in the upper system layers of containers 152 and 157 may allow for thin provisioning of capacity. In an example, network storage 170 may allow reservations for more space than network storage 170 has available based on an estimated confidence level of the space actually being used. In an example, network storage 170 grants 20% of the requested 500 GB for an initial grant of 100 GB to persistent storage 135 (block 422). In the example, network storage 170 then provides access to persistent storage 135 (block 424).

In an example, while network storage 170 is reserving and allocating persistent storage 135, VM 112 prepares container cluster 155 for instantiation by creating lower system layers for each of containers 152 and 157 in guest memory 195A (block 418). VM 112 then mounts persistent storage 135 as a network drive on VM 112 (block 430). In an example, resource agent 140A performs the mounting of persistent storage 135. In an example, VM 112 then constructs upper system layers 252 and 257 for containers 152 and 157 in persistent storage 135, for example, under the direction of orchestrator 145 (block 432). VM 112 may then construct mounted directories (e.g., data directories 210 and 215, and log directories 211 and 216) with different performance profiles (e.g., I/O rates 230, 231, 235, and 236, capacities 220, 221, 225, and 226) based on mount specifications of the image files (block 434). Therefore, in an example, the persistent storage (e.g., persistent storage 135) is provisioned to meet an aggregated performance characteristic and an aggregated capacity of image files of a container cluster (e.g., image files for containers 152 and 157), the image files of the container cluster are copied to a local memory (e.g., guest memory 195A) as lower system layers, upper system layers (e.g., upper system layers 252 and 257) are constructed in the persistent storage (e.g., persistent storage 135) based on each of the image files associated with the container cluster. The upper system layers (e.g., upper system layers 252 and 257) are attached to respective isolated guests (e.g., containers 152 and 157) launched from the image files.

In an example, orchestrator 145 requests a baseline snapshot of persistent storage 135 after the upper system layers 252 and 257 are completed, including mounted directories (e.g., data directories 210 and 215, and log directories 211 and 216) (block 436). In an example, network storage 170 takes the baseline snapshot. In an example, network storage 170 may freeze persistent storage 135 to take the snapshot (block 438). Then network storage 170 takes the snapshot and resumes the persistent storage 135 (block 440). In an example, freezing and resuming may be optional for a baseline snapshot before the container cluster 150 begins executing. For example, the data in persistent volume 135 is static while containers 152 and 157 are dormant. In an example, orchestrator 145 launches container cluster 150 (block 442). In the example, container cluster 150 launches with lower system layers on VM 112 guest memory 195A, upper system layers 252 and 257 on persistent storage 135, and mounted directories (e.g., data directories 210 and 215, and log directories 211 and 216) also in persistent storage 135, with the mounted directories mounted to the respective upper system layers (e.g., data directory 210 and log directory 211 to upper system layer 252, data directory 215 and log directory 216 to upper system layer 257) (block 444).

In an example, orchestrator 145 later requests the restart of container 157 (block 450). In the example, container cluster 150 exits container 157 (block 452). In an example, container engine 144 may trigger and/or force the exiting of container 157. In another example, container 157 may execute a shut down sequence. In an example, network storage 170 may restore the baseline snapshot of upper system layer 257, skipping restoration of mounted directories (e.g., data directory 215 and log directory 216) (block 454). In the example, container cluster 150 may resume container 157 after the restoration, preserving the previous data in data directory 215 and logs in log directory 216, while purging temporary directory 217 and any configuration changes in configuration directory 218 (block 456). In an example, the restart of container 157 may be to correct an error state.

The orchestrator 145 and/or network storage 170 may utilize the consistent snapshot capability enabled by hosting all of the writeable storage for container cluster 155 in one persistent storage 135 to perform cohesive migrations of container cluster 155 and/or persistent storage 135 to other hosts. In an example, the baseline snapshot and/or an executing snapshot captures upper system layers 252 and 257 including respective upper system layers associated with containers 152 and 157, where the executing snapshot captures the persistent storage 135 after the launching of containers 152 and 157. In an example, an executing snapshot may capture a current state of persistent storage 135.

In an example, the orchestrator 145 may suspend each container of the container cluster. For example, orchestrator 145 may suspend containers 152 and 157 of container cluster 150. Orchestrator 145 may then request a second persistent storage in a another remote memory (e.g., network storage) of equal or larger size and equal or greater performance characteristics as the first persistent storage (e.g., persistent storage 135). For example, orchestrator 145 may migrate persistent storage 135 to a different network storage due to scheduled maintenance on network storage 170. To do so, orchestrator may first request a replacement persistent storage in the new network storage to be allocated. Orchestrator 145 may then suspend containers 152 and 157 before transferring the contents of persistent storage 135 to the new persistent storage. The new persistent storage may be mounted to VM 112 by resource agent 140A. Containers 152 and 157 may then be resumed individually or together as a whole container cluster 150, with upper layers 252 and 257 in the new persistent storage. In an example, the new persistent storage may replace persistent storage 135 in the same mount point, resulting in a seamless transition for containers 152 and 157.

In an example, the orchestrator 145 may migrate container cluster 150 to a new host from VM 112, for example, to VM 116. In the example, the image files for containers 152 and 157 may be copied to VM 116 as new lower system layers for containers 152 and 157. In an example, since lower system layers are static and read-only, they may also be fungible. In an example, orchestrator 145 may suspend container cluster 150 and persistent storage 135. Orchestrator 145 may then cause persistent storage 135 to be mounted to VM 116 (e.g., via resource agent 140B). In an example, container cluster 150 may then be seamlessly resumed on VM 116 with the new lower system layers replacing the lower system layers on VM 112.

Figure 5:
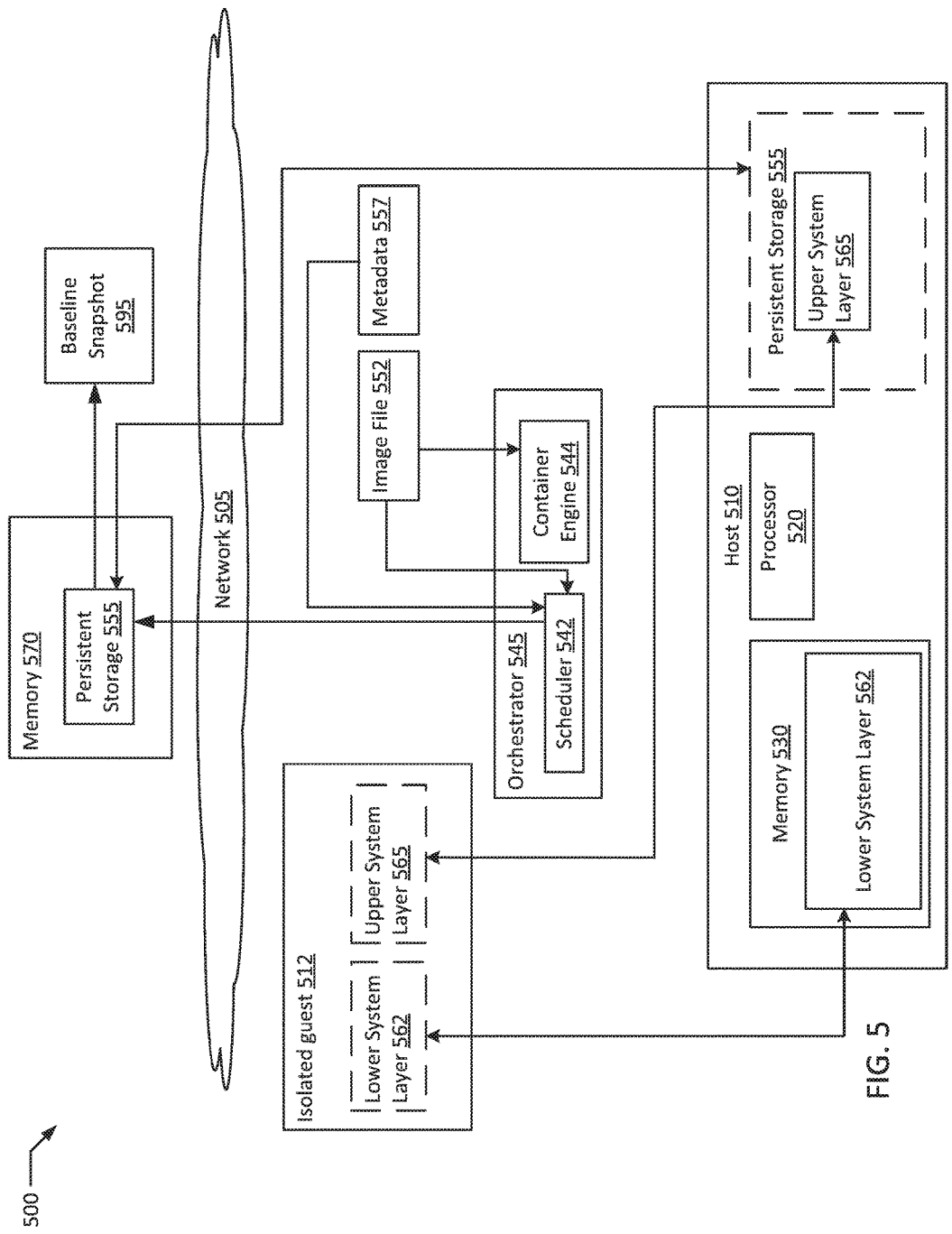
FIG. 5 is a block diagram of an example system for instantiating containers with a unified data volume according to an example of the present disclosure.

FIG. 5 is a block diagram of an example system for instantiating containers with a unified data volume according to an example of the present disclosure. Example system 500 includes a first host 510 with processor 520 communicatively coupled with memory 530, with an orchestrator 545 executing on processor 520. A memory 570 located across network 505 from host 510 may provide storage for persistent storages (e.g., persistent storage 555). An orchestrator 545 including a scheduler 542 and a container engine 544 may execute on processors 520.

The scheduler 542 may request a persistent storage 555 to be provisioned in memory 570 based an image file 552 and/or metadata 557 associated with the image file 552, where persistent storage 555 is mounted to host 510. Container engine 544 copies image file 552 to memory 530 as lower system layer 562 of isolated guest 512 based on image file 552, where lower system layer 562 is write protected. Container engine 544 constructs upper system layer 565 in persistent storage 555 based on image file 552, where baseline snapshot 595 is captured of persistent storage 555 including the upper system layer 565 after upper system layer 565 is constructed. Isolated guest 512 is launched where isolated guest 512 is attached to lower system layer 562 and upper system layer 565.

In an example, instantiating containers with a unified data volume may save significant storage space on network storage nodes, while enabling efficient container re-instantiation as well as container and/or persistent storage migration. In an example, additionally having the writable storage of a container or an entire cluster of containers share a single namespace provides significant ease of use and configuration benefits for snapshots and migrations. In an example, network storage nodes may have significantly higher capacity than local storage on container hosts and may therefore be significantly less prone to running out of storage capacity and/or throughput rate due to spikes in usage by upper system layers. By enabling directory specific storage requirement requesting and provisioning within the same persistent volume, the benefits of mounted directories may be realized without the associated latency and snapshot synchronization issues that may manifest where separate external persistent storage volumes are provisioned for each mounted directory. In addition, network storage nodes may have robust backup and disaster recovery features unavailable on local storage. For example, a network storage node may be replicated in real-time across multiple data centers. Therefore the loss of one data center (e.g., through storm damage to the data center's wiring) may be alleviated by copying the image files for containers executing in that data center as lower system layers to hosts in another data center and reattaching the persistent storages as upper system layers. With upper system layers hosted on local storage, continuous operation would not be possible and any temporary data would be lost from such a disaster recovery event.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be executed by one or more processors, which when executing the series of computer instructions, performs or facilitates the performance of all or part of the disclosed methods and procedures.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A system comprising:
a first host including a first memory;
a second memory located across a network from the first host;
one or more processors;
an orchestrator including a scheduler and a container engine;
the orchestrator executing on the one or more processors to:
request, by the scheduler, a first persistent storage to be provisioned in the second memory based on at least one of an image file and metadata associated with the image file, wherein the first persistent storage is mounted to the first host;
copy, by the container engine, the image file to the first memory as a lower system layer of an isolated guest based on the image file, wherein the lower system layer is write protected;
construct, by the container engine, an upper system layer in the first persistent storage based on the image file, wherein a baseline snapshot is captured of the first persistent storage including the upper system layer after the upper system layer is constructed; and
launch the isolated guest, wherein the isolated guest is attached to the lower system layer and the upper system layer.

2. The system of claim 1, wherein the first persistent storage is configured to meet at least one of a performance characteristic requirement and a capacity requirement based on at least one of the image file and metadata associated with the image file.

3. The system of claim 1, further comprising a resource agent, wherein the resource agent executes to:
capture the baseline snapshot;
freeze the first persistent storage;
capture the first persistent storage in an executing snapshot; and
resume the first persistent storage.

4. The system of claim 1, wherein the isolated guest is a container.

5. The system of claim 1, wherein the upper system layer includes a plurality of directories and each directory of the plurality of directories shares the same namespace.

6. The system of claim 5, wherein each directory of the plurality of directories is individually configured with respective directory specific requirements, and the respective directory specific requirements are included in the provisioning of the first persistent storage.

7. The system of claim 6, wherein a first directory of the plurality of directories is flagged as persistent and included in an executing snapshot, and a second directory flagged as temporary is excluded from the executing snapshot, wherein the executing snapshot captures the first persistent storage after the launching of the isolated guest.

8. The system of claim 7, wherein the isolated guest is reinitialized by deleting the contents of each directory flagged as temporary.

9. The system of claim 6, wherein directory specific requirements include at least one of (i) a persistence status, (ii) a performance characteristic, (iii) a capacity, (iv) an encryption setting, and (v) a type of reservation.

10. The system of claim 9, wherein the type of reservation is one of (i) a thick reservation, wherein the performance characteristic and the capacity are pre-allocated and guaranteed when the persistent storage is provisioned, and (ii) a thin reservation, wherein a portion of the performance characteristic and the capacity of the directory are pre-allocated when the persistent storage is provisioned, with the persistent storage being allowed to grow dynamically as at least one of the performance characteristics and the capacity is consumed.

11. The system of claim 5, further comprising a resource agent, wherein the resource agent executes to:
    format the first persistent storage; and
    create a mounted directory of the plurality of directories in the first persistent storage, wherein the mounted directory corresponds to a mount specification of the image file and the mounted directory is mounted as a persistent volume associated with the mount specification to the upper system layer of the isolated guest.

12. The system of claim 11, wherein the orchestrator further executes to:
    exit the isolated guest;
    restore the baseline snapshot, wherein the mounted directory is excluded from being restored based on being associated with the mount specification; and
    re-launch the isolated guest including attaching the lower system layer and the restored upper system layer to the isolated guest.

13. The system of claim 1, wherein the first persistent storage is provisioned to meet at least one of an aggregated performance characteristic and an aggregated capacity of a plurality of image files, the plurality of image files are copied to the first memory as a first plurality of lower system layers, a plurality of upper system layers are constructed in the first persistent storage based on each of the image files in the plurality of image files, and the plurality of upper system layers are attached to a respective plurality of isolated guests launched from the plurality of image files.

14. The system of claim 13, wherein the orchestrator further executes to:
    suspend each isolated guest of the plurality of isolated guests;
    request a second persistent storage in a third memory of equal or larger size and equal or greater performance characteristics as the first persistent storage;
    transfer the contents of the first persistent storage to the second persistent storage, wherein the second persistent storage is attached to the first host; and
    resume each isolated guest of the plurality of isolated guests, wherein the plurality of isolated guests execute with associated upper system layers in the second persistent storage.

15. The system of claim 13, wherein the orchestrator further executes to:
    copy the plurality of image files to a third memory on a second host as a second plurality of lower system layers;
    suspend the plurality of isolated guests and the first persistent storage;
    attach the first persistent storage to the second host; and
    resume the plurality of isolated guests on the second host.

16. The system of claim 13, wherein at least one of the baseline snapshot and an executing snapshot captures the plurality of upper system layers including respective upper system layers associated with each isolated guest of the plurality of isolated guests, wherein the executing snapshot captures the first persistent storage after the launching of the plurality of isolated guests.

17. A method of instantiating isolated guests on a host including a first memory, the method comprising:
    requesting, a persistent storage to be provisioned in a second memory located across a network from the host based on at least one of an image file and metadata associated with the image file;
    mounting, the persistent storage to the host;
    copying the image file to the first memory as a lower system layer of an isolated guest based on the image file, wherein the lower system layer is write protected;
    constructing an upper system layer in the first persistent storage based on the image file;
    capturing, a baseline snapshot of the persistent storage including the upper system layer after the upper system layer is constructed; and
    launching the isolated guest, wherein the isolated guest is attached to the lower system layer and the upper system layer.

18. The method of claim 17, wherein the upper system layer includes a plurality of directories, each directory of the plurality of directories shares the same namespace, the method further comprising:
    individually configuring each directory of the plurality of directories based on directory specific requirements associated with each respective directory, wherein the directory specific requirements include at least one of (i) a persistence status, (ii) a performance characteristic, (iii) a capacity, (iv) an encryption setting, and (v) a type of reservation.

19. The method of claim 18, further comprising:
    creating a mounted directory of the plurality of directories in the first persistent storage, wherein the mounted directory corresponds to a mount specification of the image file;
    mounting the mounted directory as a persistent volume associated with the mount specification to the upper system layer of the isolated guest;
    exiting the isolated guest;
    restoring the baseline snapshot, wherein the mounted directory is excluded from being restored based on being associated with the mount specification; and
    re-launching the isolated guest including attaching the lower system layer and the restored upper system layer to the isolated guest.

20. A computer-readable non-transitory storage medium storing executable instructions for instantiating isolated guests on a host including a first memory, which when executed by a computer system, cause the computer system to:
    request, a persistent storage to be provisioned in a second memory located across a network from the host based on at least one of an image file and metadata associated with the image file;
    mount, the persistent storage to the host;

copy the image file to the first memory as a lower system layer of an isolated guest based on the image file, wherein the lower system layer is write protected;

construct an upper system layer in the first persistent storage based on the image file;

capture, a baseline snapshot of the persistent storage including the upper system layer after the upper system layer is constructed; and launch the isolated guest, wherein the isolated guest is attached to the lower system layer and the upper system layer.

* * * * *